May 31, 1960     A. B. CASTLE     2,938,700

MOUNTING MEANS

Filed Jan. 6, 1956

INVENTOR
A. B. CASTLE

BY *Minford A. Julian*

ATTORNEY

United States Patent Office 2,938,700
Patented May 31, 1960

2,938,700

MOUNTING MEANS

Alfred B. Castle, 4104 Maryland Drive, Brookmont, Md.

Filed Jan. 6, 1956, Ser. No. 557,674

10 Claims. (Cl. 248—358)

The present invention relates to mounting means and more particularly mounting means which absorbs shocks and vibrations. Although the mounting is useful for machines the mounting is suitable for mounting any element to reduce the shock or vibrations which otherwise might be transmitted from a supporting means to the element.

Heretofore many expedients have been used in an effort to reduce vibrations and shocks which might damage equipment or injure persons, and some expedients have included rubber as a part of such expedients and in some cases the rubber has been the entire vibration absorbing mounting means. Particularly at low temperatures the rubber mounting means become hard and lose their effectiveness and a satisfactory solution for the mounting of equipment has not been satisfactorily solved. Also most vibration absorbing mounting means have been of such a nature as to have a harmonic vibration which would frequently become synchronized with the vibrations intended to be absorbed with corresponding increase in the amplitude of vibration thereby defeating the purpose for which the mounting means was intended.

An object of the present invention is to overcome the defects of the prior art and provide a resilient mounting for equipment, instruments, and persons which will protect against objectionable shock or vibrations.

Another object is to provide a mounting means which can be designed for obtaining any desired characteristics including variations in force absorbing resistance in different directions to correspond with the variation in forces encountered from such different directions.

A further object is to provide an assembled unit for rapid application to a support for mounting an element so as to protect such element against damaging forces which may arise due to shock, accelerating forces, vibrations, or the like.

Another object is to provide an unassembled kit for producing a shock and vibration reducing mounting which might have any desired characteristics of resiliency in any direction including three dimensions, and controlling the resilient support in each of the directions, designed so that the resisting forces may be accurately predetermined at the time of assembly.

A further object is to provide a means for damping the oscillations of a shock mount.

Another object is to provide simple structural elements which may be readily produced and modified as necessary to obtain the desired characteristics for a resilient mounting of an element to be protected.

A further object is to provide a method of designing shock absorbing and resilient mounts from readily obtainable materials whereby desired characteristics are obtained to meet the requirements in accordance with the needs.

Other and further objects will appear as the description proceeds and upon reference to the accompanying drawing in which.

Briefly the present invention comprises a method and structure for mounting machine elements or delicate elements which may vibrate objectionably and preferably includes a cup shaped receptacle having a friction lining, a plurality of serpentine shaped leaf springs mounted with their ends supported from the mouth of the receptacle so that a portion of the leaf springs may contact the friction material as the springs flex in use. Means for attaching the element on intermediate portions of the springs is provided whereby resilient mounting of the element may be had for movement in all directions and the resistance to deformation may be predetermined by the specific shape, cross section and design of the leaf springs. The method involved includes arranging the size, shape and design of the parts to obtain any desired characteristics.

Figure 2:
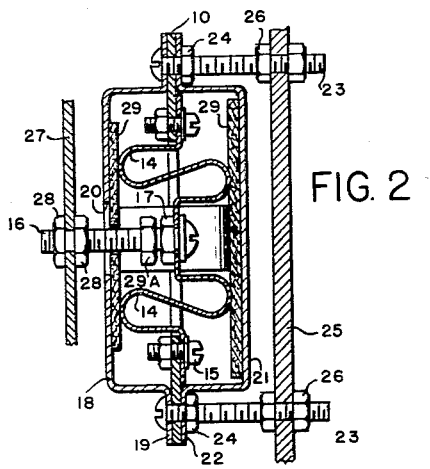
Fig. 2 is a section taken on line 2—2 of the sub assembly of Figure 1 and showing the complete mounting in cup shaped receptacles mounted on a main support and showing a portion of a resiliently mounted element such as an instrument panel.

Referring more particularly to the drawing a cantilever spring mounting member or plate 10 having a central aperture 11 and a plurality of bolt receiving mounting apertures 12 supports an X-shaped spring 13 having a plurality of cantilever springs or radiating arms 14 having S-shaped configurations as clearly shown in Fig. 2 with the free end of each arm fixed to the plate 10 by a bolt 15 or the like passing through the arm and through the apertures of the plate. The X-shaped spring in this modification is made from a single sheet provided with a central aperture through which a bolt 16 passes being fixed by its head and a nut 17 to the center, said bolt serving as an attaching means for the element 27 to be supported.

A cup shaped receptacle 18 having a flange 19 and a central aperture 20 through which bolt 17 projects is secured to one side of the plate 10 while a second cup shaped receptacle 21 having a flange 22 is secured to the other side of the plate 10 by means of mounting bolts 23 passing through apertures 12 of the plate 10 and registering apertures in the flanges 19 and 22, the cup shaped receptacles and the plate 10 being held in assembled relation by the heads of the bolts 23 and nuts 24. The bolts 23 also serve to secure the shock mount to a support such as a panel like support member 25, which may be part of an airplane, for example, and through which bolts 23 pass, said bolts serving to adjustably secure the shock mount in position on the member 25 by means of nuts 26 or the like. It will be apparent that rivets or the like may be substituted for bolts 15, 16 and 23. An element 27 such as an airplane instrument panel is supported by the bolt 16 in adjusted position by means of adjustable nuts 28. Friction material 29 such as "Teflon" for example, is provided on the inner surface of each cup shaped receptacle 18 and 21 contacting the S-shaped radiating spring arms 14 and for obtaining a damping effect as the spring flexes in use.

The friction disk 29 may also serve as a stop by having its central aperture of a size to permit sliding axial movement of the bolt 16 so that a stop such as nut 17 will limit the projection of the bolt outwardly of the cup 18. If desired a suitable stop which may be adjustable such as one or more nuts 29A may be provided on bolt 16 to limit this movement as desired.

It will be noted that the shock mount permits movement of the element 27 in all directions relative to the fixed support 25 and that the shock mount may be used in any position and any angle and that the shock mount may be reversed so that the bolt 16 is attached to the relatively fixed support and the bolts 23 attached to the element to be supported. It will also be noted that the shape of the S-shaped spring, the thickness of metal, the width and number of the radiating arms, and the stress on the springs may be varied to obtain different characteristics to resist the vibration producing forces from different directions.

One cup 28 having a flange 29 projecting outwardly from its mouth and having an opening 30 in its base supports spring members 31 and 32 having radiating arms 33 and 34 respectively of serpentine shape and with the spring members shown as of X-shape, for example, although a greater or lesser number of radiating arms may be provided within the spirit of the invention. Each radiating arm is secured to the flange 29 by means of rivets 35 or the like. The central portions of the spring members 31 and 32 are secured together by means of a bolt 36 which passes through apertures in the spring members and through a spacer tubular member 37 separating the central portions as shown in Fig. 4 the head of the bolt and a nut 38 locking the central portions in spaced relation.

A cover member in the form of a cup 39 having a flange 40 overlies the mouth of the cup 28 and is secured to the cup 28 by means of bolts 41 passing through apertures 42 in flange 29 and registering apertures in flange 40 of the cover 39, said bolts also passing through spacing tubes 43 and through registering apertures in a support member 44 to which the bolts are secured by means of nuts 45 which when drawn up tight serve to secure the cups 28 and 39 in assembled relation and also fix the cups on the support 44. The bolt 36 passes through the opening 30 in cup 28 with sufficient clearance to allow limited radial movement thereof, and of an element 46 such as an instrument panel or the like to which the bolt 36 is adjustably fixed by means of nuts 47. The cups 28 and 39 are preferably provided with a friction lining material 48 which frictionally engages the radial arms 33 and 34 producing a damping effect resisting any vibrations being produced. The cover 39 is provided with an aperture 48A for access to the head of bolt 36 and to reduce weight.

Figure 1:
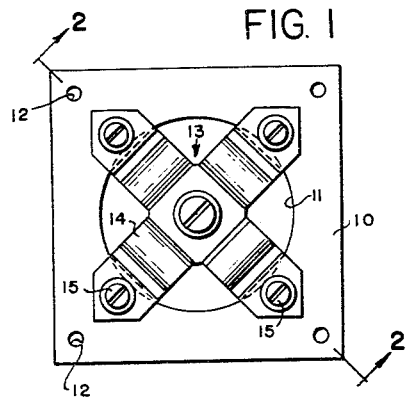
Figure 1 is a plan view of a sub assembly including an apertured plate and a plurality of radially arranged S-shaped springs mounted in the aperture of the plate.
Figure 3:
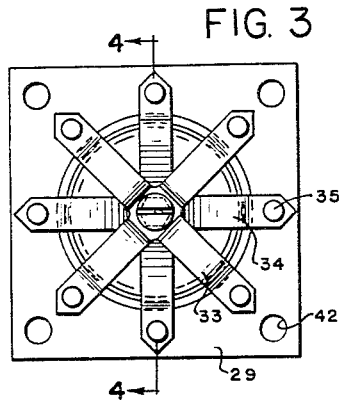
Fig. 3 is a plan view of a portion of a modified form of the invention in which two sets of radially extending serpentine springs are mounted in a cup shaped receptacle providing spaced supporting points for the element mounting means, and with parts omitted to clearly show the relation between the two sets of springs.
Figure 4:
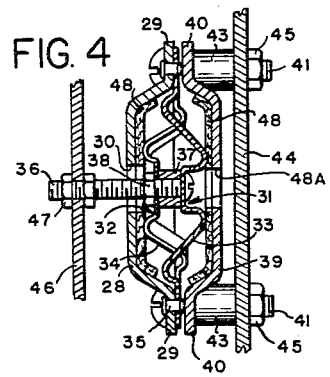
Fig. 4 is a section taken on line 4—4 of Fig. 3 and showing the cooperating cup shaped housing in position and with the shock mount used for the mounting of an element from a support.

It will be noted that the serpentine shape of the radial arms 33, 34 is more shallow than radial arms 14 of the modification shown in Figs. 1 and 2 and such shape shown in Figs. 3 and 4 permits axial movement more readily and with less resistance while radial movement is resisted more strongly in the form shown in Figs. 3 and 4. Also in the form shown in Figs. 3 and 4 the spacing between the center portions of the two X-shaped spring members 31 and 32 gives additional support to the bolt 36 resisting swinging movement of such bolt. In the modification of Figs. 1 and 2 radial movement is resisted less strongly by the deep serpentine shape while axial movement of bolt 16 is resisted relatively more strongly. The cup shaped receptacles 18 and 21 of Figs. 1 and 2 may be omitted in some applications, if desired, and the varying length of the radial arms tends to change the period of vibration so that the likelihood of an extended period of harmonic vibration occurring is reduced.

Figure 5:
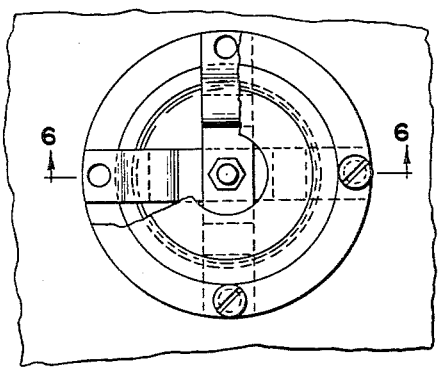
Fig. 5 is a plan of another modification of the shock mount in use as seen from the element supported side thereof with such element omitted and parts broken away to clearly show the separate springs.
Figure 6:
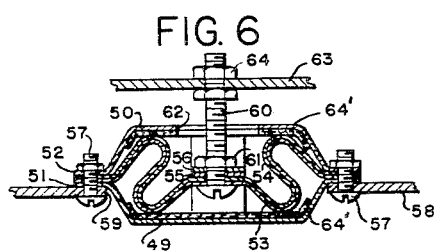
Fig. 6 is a section taken on line 6—6 of Fig. 5 showing the serpentine shape of the two ply leaf springs for increasing the capacity of the shock mount.

Upon reference to Figs. 5 and 6 a modified shock mount includes flanged cups 49 and 50 having flanges 51 and 52 respectively which support the ends of leaf springs formed of separate strips 53, 54 and 55, 56 and to which the free ends of the leaf springs are fixed by means of bolts 57 to a support 58 having a shock mount receiving aperture 59 which accommodates the cup 49. The bolts 57 pass through the flanges of the cups through the support 58 and the leaf springs thereby maintaining the parts of the shock mount in assembled relation and also fixing the shock mount on the support thereby serving several functions and permitting the shock mount to be assembled and manufactured in the field without the need of complicated tools or equipment.

For supporting an element from the shock mount a bolt 60 passes through apertures in the leaf springs 53 to 56, incl., being secured to the leaf springs by means of the head of the bolt and a nut 61 and passing outwardly of the cup 59 through an aperture 62 which allows radial and axial movement of the bolt 60 and an element 63 secured to the bolt 60 by means of nuts 64 which provide for adjustment to accommodate various spacings which may exist. Further adjustment may be had by mounting the shock mount on the opposite side of the support 58, if desired. It will be noted that the leaf springs are provided with an S-shape contour arranged so that all of the principal portions of the springs are at an angle to adjacent contacting surfaces of the cups so that the springs will be cammed as vibrations occur between the element 63 and the support 58 permitting movement in all directions. Different characteristics may be had by increasing the number of leaves, their sizes and the particular bend arrangement thereof. The curves in the bight portion of the S-shaped arms are reversely offset as shown. Damping action may be obtained by means of friction material 64′ in the base of the cups and, if desired, the springs may be prestressed to obtain increased effect in a selected direction.

Figure 7:
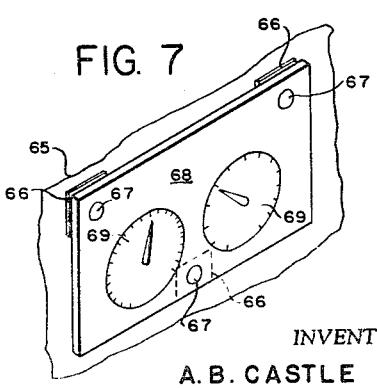
Fig. 7 is a perspective of a fragmentary portion of a support such as an airplane with three shock mounts of the present invention used to protect an instrument panel against shock and vibration.

An application of shock mounts is illustrated in Fig. 7 wherein a fragmentarily shown support 65 has secured thereto three shock mounts 66, 66, 66 from which project element attaching studs 67 which are secured to an element such as an instrument panel 68 carrying one or more relatively delicate instruments 69. It will be observed that the studs 67 may be fixed to the panel element 68 so as to project therefrom at a fixed angle such as a right angle as shown in the previous figures and maintained in such position by means of the attaching nuts thereby preventing swinging movement of the studs and controlling the manner in which the element 68 can move due to vibration.

Under some conditions it may be desirable to provide limiting stops to prevent excessive bending of the springs which might produce stresses beyond the elastic limit of the spring material and such stops may be provided by means of washers fixed on the bolts 16, 36, or 60 and adapted to contact the bases of the cups. Also the radial movement of the element attaching bolts is limited by engagement with the edges of the apertures in the base of its associated cup.

Although each shock mount allows movement in all directions it is possible to design the springs to have greater resistance to vibration forces or other stresses regardless of whether the vibration is produced by the element or the support so that almost any desired characteristics can be obtained in a shock mount according to the present invention. It is also possible to have shock mounts of differing characteristics supporting a single element to obtain still different end results thereby making the present invention adaptable to innumerable uses. Although all of the effects are not clearly explainable because of the great variations possible, it might be noted that the effective length of a radial arm may vary in use thereby changing its natural frequency and in use the effective length of each arm may be different from the effective length of any other arm thereby tending to prevent the possibility of harmonic vibration occurring in all of the radial arms at the same time and consequently a damping effect is obtained thereby.

It will be noted that when vibration or deflection occurs in a radial direction relative to the element attaching bolt, a twisting action takes place on at least some and frequently in all of the radial arms which twisting results in a still further change in the natural frequency of the various arms.

One manner of producing the shock mounts is to provide plates like 10 and spring stock sheet material, cutting the spring stock to shape and then forming the spring as conditions require and thereafter tempering the spring for retaining the shape under operating conditions. A suitable material for the springs is berillium which may be shaped and then heat treated by placing the formed spring in an oven at a temperature of 600° F. for two hours time. To avoid any objectionable effect on magnetic instruments the materials are preferably non-magnetic, the cups being made of aluminum, the springs of berillium, and the bolts of brass, or equivalent materials. Where corrosion and magnetic effects are unimportant iron and steel may be used.

It will be apparent that various changes may be made within the spirit and scope of the present invention within the definition of the following claims.

I claim:

1. A resilient mounting comprising a pair of walls arranged in juxtaposed spaced relation, means interconnecting said walls to maintain said walls in fixed relation, friction material on the surface of each wall facing the other wall, a leaf spring mounting member positioned between said walls, at least one of said walls having an opening, a plurality of leaft springs each extending between said opening and said mounting member and fixed to said mounting member, at least some of said leaf springs having portions extending at an angle to said at least one wall and contacting the friction material on the surface of said one wall facing the other wall, at least some of said leaf springs having portions extending at an angle to the other wall and contacting the friction material on the surface of said other wall facing said one wall, means connecting all of said leaf springs together adjacent said opening, and means mounted on said leaf springs adjacent said connecting means extending outwardly through said opening providing resilient and damping support for an object, and means to mount said walls and the interconnecting means on a support.

2. A resilient mounting comprising a pair of walls arranged in juxtaposed spaced relation, means interconnecting said walls to maintain said walls in relatively fixed relation, friction surface on each wall facing the other wall, a cantilever spring mounting member positioned between said walls, said walls and said interconnecting means having an opening, a plurality of cantilever springs each extending between a position adjacent said opening and said mounting member and fixed to said mounting member, at least some of said cantilever springs having portions extending at an angle to at least one wall and contacting the friction surface on said one wall facing the other wall, at least some of said cantilever springs having portions extending at an angle to the other wall and contacting the friction surface on said other wall facing said one wall, means connecting said cantilever springs together adjacent said position adjacent said opening, means mounted on said springs adjacent said connecting means extending outwardly through said opening providing resilient and damping support for an object, and means to mount said walls and the interconnecting means on a support.

3. The invention according to claim 2 in which at least some of the cantilever springs have an S-shape and contact both facing surfaces of the walls.

4. The invention according to claim 2 in which a plurality of the springs are provided in superimposed abutting relation to increase the resistance to deflection.

5. The invention according to claim 2 in which at least three of the resilient mountings support a single object to assure controlled movement of the object with respect to the support.

6. The invention according to claim 2 in which at least one of the walls is formed in a cup-shaped member and the cantilever spring mounting member is relatively fixed in the cup shaped member.

7. The invention according to claim 6 in which the means connecting the cantilever springs is a bolt project-out of the cup shaped member and provides securing means for attachment to the object.

8. The invention according to claim 2 in which some of the cantilever springs contact only one of the walls and other cantilever springs contact only the other wall.

9. The invention according to claim 2 in which stop means are provided to limit the displacement of the springs.

10. The invention according to claim 2 in which the springs are prestressed to contact the walls and to provide the desired initial resistance to displacement.

References Cited in the file of this patent

UNITED STATES PATENTS

| | | |
|---|---|---|
| 997,842 | Metzroth | July 11, 1911 |
| 1,037,729 | Collins | Sept. 3, 1912 |
| 1,988,295 | Berry | Jan. 20, 1935 |
| 2,064,751 | Hussman | Dec. 15, 1936 |
| 2,216,814 | Gray et al. | Oct. 8, 1940 |
| 2,387,066 | Harding | Oct. 16, 1945 |
| 2,425,565 | Robinson | Aug. 12, 1947 |
| 2,606,447 | Boltinghouse | Aug. 12, 1952 |
| 2,658,710 | Titus | Nov. 10, 1953 |
| 2,688,479 | Barbera | Sept. 7, 1954 |
| 2,744,718 | Markowski et al. | May 8, 1956 |
| 2,775,445 | Goodloe | Dec. 25, 1956 |

FOREIGN PATENTS

| | | |
|---|---|---|
| 764,050 | France | Feb. 26, 1934 |